Jan. 19, 1954 F. J. CARNEY 2,666,678
PISTON
Filed June 22, 1950

INVENTOR.
FRED J. CARNEY
BY
Florian G. Miller
Atty.

Patented Jan. 19, 1954

2,666,678

UNITED STATES PATENT OFFICE 2,666,678

PISTON

Fred J. Carney, Erie, Pa., assignor to Bury Compressor Company, Erie, Pa., a corporation of Pennsylvania Application June 22, 1950, Serial No. 169,567

5 Claims. (Cl. 309—4)

1

This invention relates generally to pistons and more particularly to pistons used in air and gas compressors, pumps, and the like.

Devices of this character, made in accordance with the teachings of the prior art, and with which I am familiar, are used in many industrial applications where air free from oil vapors is required such as for operating boiler room controls, in tin plants, food processing plants, and in plants where oxygen is used inasmuch as no lubricant is permitted to be used in the cylinder because it might contaminate the food or it might cause fire in the presence of flammable gases. Much difficulty is experienced with present non-lubricating pistons because of the air pressure built up beneath the sealing rings in the sealing ring grooves, thereby forcing them outwardly whereby they wear quickly. This is particularly true when carbon or other non-metallic sealing rings are used. This wear soon permits an excessive leakage past the piston, greatly decreases the efficiency of the machine, and frequent replacement of rings is required with added wear on the cylinder walls. This is particularly true when high air pressures are required.

To obtain maximum efficiency in a pump, compressor, or the like, it is necessary that a maximum area of the periphery of a piston engage the inner wall of a cylinder. Where sealing rings on the piston have been forced outwardly by air or gas under pressure in the grooves under the rings, in addition to the pressure generated by the springs in the grooves, excessive wear is caused on the sealing rings with early loss in efficiency.

It is, accordingly, an object of my invention to eliminate this excessive air pressure built up under the rings on a piston and it is more particularly an object of my invention to provide a self-lubricating piston which is simple in construction, economical in cost, economical in manufacture, efficient in operation, easily installed and removed from a cylinder, and low in maintenance and upkeep costs.

Another object of my invention is to provide a non-metallic self-lubricating piston with vented peripheral grooves for supporting sealing rings of the same or like material, and means for controlling any pressures built up in the grooves underneath the rings.

Another object of my invention is to provide novel means for alternately venting the sealing ring grooves on a piston to opposite sides of the piston in accordance with the direction of the movement of the piston in the cylinder.

2

Another object of my invention is to provide a self-lubricating carbon piston especially adapted for high pressure service with a minimum pressure being exerted outwardly on the sealing rings carried thereby, insuring uniform wear on the pistons and rings.

Other objects of my invention will become evident from the following detailed description, taken in conjunction with the accompanying drawings, in which Fig. 1 is a vertical sectional view through my novel piston;

Figures 1, 2, 3:
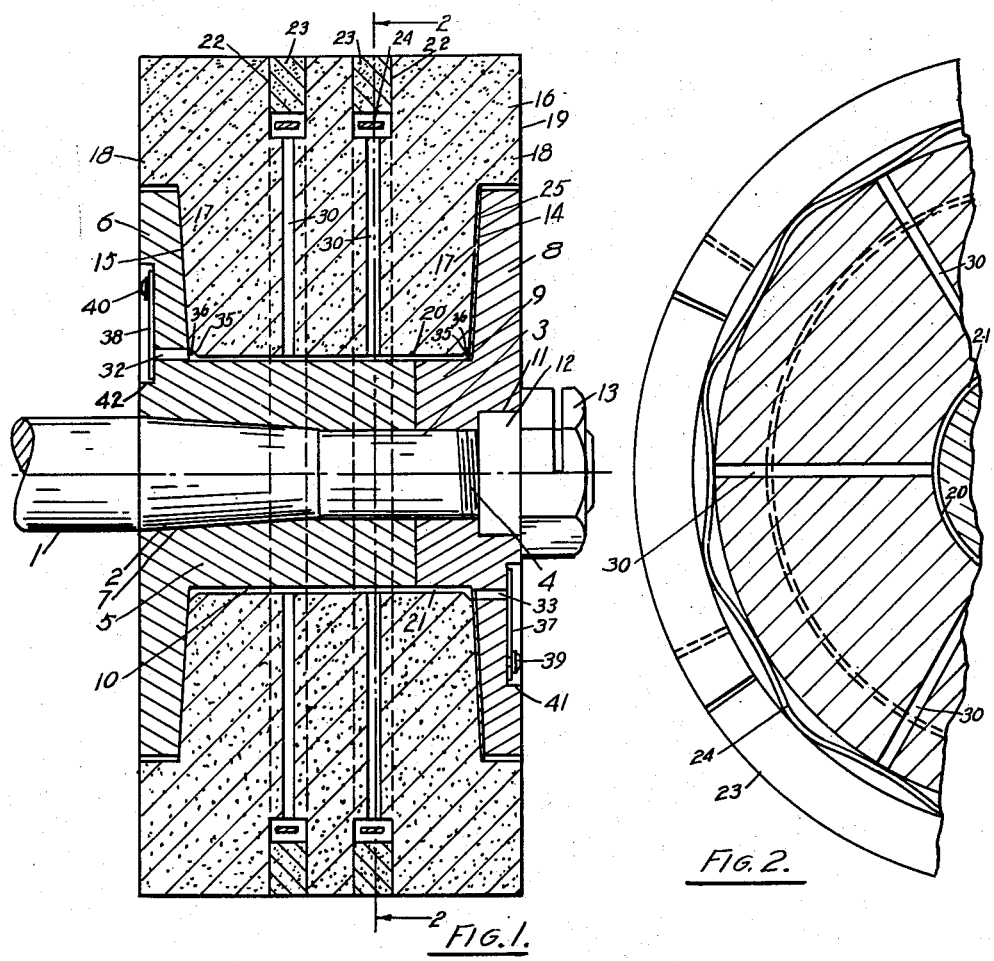
Fig. 2 is a fragmentary view taken on the line 2—2 of Fig. 1.
Fig. 3 is a perspective view of one section of the sealing ring used in my novel piston.

Referring now to the drawings, I show in Figs. 1 and 2 a piston rod 1 having a tapered portion 2 and a reduced end portion 3 threaded at 4. A cylindrical shroud or body member 5 with an end flange 6 has a partially tapered bore 7 complementary to the tapered portion 2 on the reduced end portion 3 of the piston rod 1 so that it may be mounted thereon as shown in Figs. 1 and 2. An end flange or follower 8 having an inwardly cylindrical bossed portion 9 is disposed on the reduced end 3 of the piston rod 1 and it complements the member 5 to form a generally rectangular shaped annular groove 10. The follower 8 has a recessed portion 11 for receiving the projecting portion 12 of a lock nut 13 which threadably engages the threaded end 4 of the piston rod 1 to secure the members 5 and 8 on the end thereof. The inner side 14 of the follower 8 and the inner side 15 of the flange 6 on the member 5 are slightly tapered or flared outwardly. An annular self-lubricating carrier ring 16 has the sides 17 thereof tapered for engagement with the tapered inner sides 14 and 15 of the follower 8 and the flange 6 of the member 5, respectively. The ring 16 has laterally extending, overhanging portions 18 adjacent the periphery thereof which overhang the outer peripheral surfaces of the follower 8 and the flange 6 on the body member 5. The overhanging portions 18 greatly increase the area of the peripheral portion of the ring 16 in engagement with the inner wall of a cylinder. The lateral side surfaces 19 of the overhanging portions 18 of the member 16 are offset inwardly a very slight amount from the outer faces of the follower 8 and the flange 6 on the member 5 to prevent the faces 19 or any other portion of the ring 16 to come into engagement with the heads of a cylinder in which the piston is reciprocated. The bore 20 of the ring 16 is slightly larger than the diameter of the body member 5 and the bossed portion 9 of the follower 8 so as to define an annular clearance or space 21 therebetween and also to facilitate the assembly and disassembly of the ring 16. A slight clearance is also provided between the outer periphery of the follower 8 and the flange 6 on the member 5 and the overhanging portions 18 of the carrier ring 16. The ring 16 has outer peripheral grooves 22 for receiving segmental sealing rings 23. The segmental rings 23 are of a conventional type and they are urged outwardly for sealing engagement with the inner surface of a cylinder by spring members 24. Shims 25 are provided between the tapered surface 14 of the follower 8 and a complementary tapered side 17 of the ring 16 to compensate for any looseness of the ring 16. The slight taper on the inside face 14 of the follower 8 and the inside face or tapered portion 15 of the flange 6 on the member 5 throws the tension on the tapered portion 17 of the ring 16 outwardly from the inner bore 20 thereof thus preventing the lateral crushing of the ring 16 between the follower 8 and the flange 6 on the member 5.

Now coming to the gist of my invention, I show radially extending apertures 30 extending from the space 21 to the bottom of the grooves 22 in which the sealing rings 23 are disposed. Laterally extending apertures 32 and 33 in the flanged portion 6 on the cylindrical member 5 and in the follower 8 are in fluid flow relationship with the annular space 21 between the inner periphery of the bore 20 of the ring 16 and the outer periphery of the body 5 and the bossed portion 9 of the member 8 to vent the grooves 22 to atmosphere. The outer marginal edges 35 of the bore 20 in the ring 16 are tapered or chamfered to provide annular grooves 36 adjacent the apertures 32 and 33 respectively so as to facilitate the flow of fluid between the apertures 32 and 33 respectively and the annular space 21 between the inner periphery of the bore 20 of the ring 16 and the outer periphery of the body 5 and the bossed portion 9 of the flanged member 8. Flapper valves 37 and 38 adapted to be opened by a slight pressure are secured by screws 39 and 40, respectively, in recesses 41 and 42 on the outer sides of the flanged portion 6 of the body member 5 and the flanged member 8, respectively, normally covering the apertures 32 and 33 in the flange 6 on the member 5 and the flanged follower 8, respectively.

I prefer to use a self-lubricating carbon in my carrier ring 16 and sealing rings 23 because it is a comparatively hard material, it will withstand maximum wear, and it is self-lubricating.

In the operation of my novel piston, when the piston moves forward on the compression stroke in the direction of the flanged end 6 of the member 5 and pressure is built up in the cylinder in front of the piston, whatever air or gas escapes between the sides of the sealing rings 23 into the sealing ring grooves 22 is not built up therein but is passed through apertures 30 into the annular space 21 and outwardly through the aperture 33 in the flanged member 8, the pressure of the escaping air or gas pushing the flapper valve 37 outwardly to permit the escape of the air or gas. At the time the piston moves forwardly, the opposite side of the piston, that is, the side of which the outer face of the flange 8 is a part, is on the intake or atmospheric or low pressure side of the cylinder. The pressure beneath the sealing rings 23 during the compression stroke can be controlled by regulating the size of the apertures 30 and the apertures 32 and 33 in the flanged portion 6 of the body member 5 and the flanged member 8, respectively.

When the piston is moved in the opposite direction towards the end containing the follower 8, the operation reverses itself and the air or gas entering the grooves 22 underneath the sealing rings 23 is vented through the apertures 30 into the annular space 21, and through the aperture 32 in flange 6 of the member 5 and past the flapper valve 38 to the atmospheric or low pressure side of the piston.

Although I describe my piston as a self-lubricating piston, it will be evident upon inspection thereof that it has many other applications in other types of pistons where sealing rings are used.

It will be evident from the foregoing description that I have provided a novel piston whereby the area underneath the sealing rings in the grooves in which they are disposed is automatically vented to the atmospheric or low pressure side of the piston on each stroke thereof, whereby automatic valves close the venting aperture on the compression side of the piston and automatically open the aperture on the atmospheric side of the piston upon the compression stroke thereof, and whereby the pressure beneath the sealing rings may be controlled.

Various changes may be made in the specific embodiment of my invention without departing from the spirit thereof or from the scope of the appended claims.

What I claim is:

1. A piston for disposal on a piston rod comprising a cylindrical member having an outwardly directed end flange with a laterally extending aperture therein of predetermined size, a flapper valve disposed over said aperture, an annular bored carbon ring having an annular groove on the periphery thereof and a radially extending aperture of predetermined size connecting said groove and the bore thereof disposed on said cylindrical member, the bore of said carbon ring being spaced a predetermined distance from the outer periphery of said cylindrical member, an end plate having a laterally extending aperture of predetermined size engaging one side of said ring and being complementary to said cylindrical member, a flapper valve covering the outer side of said aperture, said apertures in said end flange of said cylindrical member and said end plate being in fluid flow relationship with the space between the inner periphery of the bore of said carbon ring and the outer periphery of said cylindrical member, means for securing said cylindrical member and said end plate on a piston rod with said carbon ring secured between the end plate and the flange, and a sealing ring for disposal in said peripheral groove, said radially extending aperture being in fluid flow relationship with the apertures in said end flange of said cylindrical member and said end plate, respectively.

2. A piston as set forth in claim 1 wherein the marginal edges of said bore in said ring are tapered to define an annular space adjacent the apertures in said flange of said cylindrical member and said end plate, respectively.

3. A self-lubricating piston comprising mated cylindrical members having spaced opposed apertured flanged members defining an annular groove, means for securing said flanged members together on a piston rod, an axially bored self-lubricating annular ring member disposed in said annular groove having an outer peripheral groove and a radially extending aperture leading from said groove to the inner bore thereof, said flanged cylindrical members having laterally extending apertures of predetermined size in fluid flow relationship with the radially extending aperture in said ring member, valves carried by said flanged members for alternately opening and closing said apertures to the flow of fluid upon alternate movement of said piston, and a sealing ring disposed in said peripheral groove.

4. A piston as set forth in claim 3 wherein each of said mated flanged members have recesses on the outer faces thereof for nesting a flapper valve disposed over the apertures therein.

5. A self-lubricating piston comprising mated cylindrical members having spaced opposed flanges defining a substantially rectangular shaped, annular groove between the flanged portions thereof, the flanged portions of said mated members having laterally extending apertures of predetermined size therein, a self-lubricating carbon ring secured in said annular groove having a peripheral sealing ring groove and a radially extending aperture of predetermined size extending from said groove to the inner bore thereof, said apertures in said flanged members being in fluid flow relationship with the radially extending aperture in said carbon ring, flapper valves on the outer side of said flanged members for automatically closing the aperture in the flanged member on the compression side of said piston in its movement in a cylinder and for opening the aperture in the opposite flanged member for venting said sealing ring groove to the atmospheric side of said piston in a cylinder, and a sealing ring disposed in said groove.

FRED J. CARNEY.

References Cited in the file of this patent

UNITED STATES PATENTS

| Number | Name | Date |
|---|---|---|
| 1,172,337 | Batty | Feb. 22, 1916 |
| 1,416,696 | Dennedy | May 23, 1922 |
| 2,092,087 | Saharoff | Sept. 7, 1937 |
| 2,158,351 | Ames et al. | May 16, 1939 |
| 2,557,497 | Carney | June 19, 1951 |

FOREIGN PATENTS

| Number | Country | Date |
|---|---|---|
| 175,424 | Germany | June 17, 1935 |